Dec. 18, 1934. C. STEENSTRUP 1,985,064
WATER COOLER
Original Filed April 16, 1929
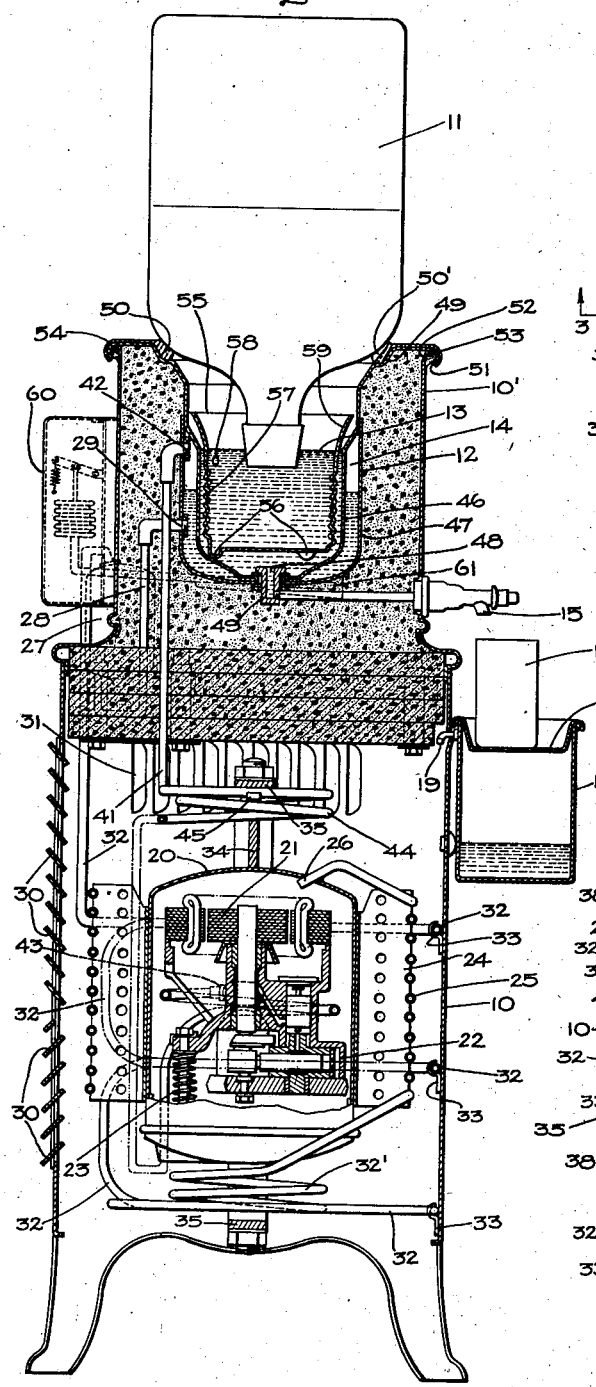
Inventor:
Christian Steenstrup,
by Charles E. Tullar
His Attorney.

Patented Dec. 18, 1934

1,985,064

UNITED STATES PATENT OFFICE 1,985,064

WATER COOLER

Christian Steenstrup, Schenectady, N. Y., assignor to General Electric Company, a corporation of New York Application April 16, 1929, Serial No. 355,551
Renewed July 11, 1934

22 Claims. (Cl. 62—141)

My invention relates generally to refrigerating systems, and more particularly to water coolers.

An object of my invention is to provide a water cooling refrigerating system including a water cooling unit and a housing having a closed top constructed in such manner that it can be readily manufactured.

Another object of my invention is to provide a water cooling unit in which water flows therefrom in a circuitous path over the surfaces of the cooling unit so as to most effectively utilize the surface of the cooling unit for cooling the water, and of such construction that the cooling surfaces can be readily cleaned.

Further objects and advantages of my invention will become apparent as the following description proceeds, and the features of novelty which characterize my invention will be pointed out with particularity in the claims annexed to and forming a part of this specification.

In the drawing, Fig. 1 is a vertical sectional view of a water cooler embodying the novel features of my improved refrigerating system; Fig. 2 is a plan view of the lower portion of the housing of the water cooler, and Fig. 3 is a fragmentary vertical section approximately on the line 3—3 of Fig. 2.

Although my improved refrigerating system is applicable to many other forms of devices, for convenience in illustration, I have shown the same in the drawing in connection with a water cooler stand in which water is supplied to the cooling unit of the system from an inverted bottle supported over the same. This water cooler stand includes a housing 10 in the upper portion 10' of which an inverted bottle of water 11 is supported with the mouth thereof immersed in the cooling unit 12 of the refrigerating system so as to maintain the water level therein approximately as indicated at 13. The cooling unit is provided with an evaporator chamber 14 for cooling the water in the unit and cold water is withdrawn therefrom at a push button faucet 15 for filling a glass 16, or other vessel, which is supported in a depressed, perforated top 17 of a waste water receptacle 18 which is removably supported on the housing 10 at 19.

Any suitable refrigerating apparatus may be used to produce the desired refrigerating effect in the evaporator chamber 14, but I prefer to employ a construction similar to that described and claimed in my Patent No. 1,736,635, granted November 19, 1929, on the application of Christian Steenstrup, to the General Electric Company assignee of the present application. This apparatus comprises a closed casing 20 having a motor 21 and a compressor 22 discharging into the casing forming a unitary structure and mounted on springs 23 to make the machine quiet in operation. Cooling fins 24 are secured to the outside of the casing 20 and serve to support a condenser pipe coil 25, one end of which communicates with the casing at 26, and the other end of which communicates with a float chamber 27 from which liquid refrigerant is supplied to the evaporator chamber 14 through the conduit 28 connected thereto at 29. During the operation of the apparatus, the heat from the casing 20 and the condenser pipe coil 25, will, if the circulation of air about them is not obstructed, induce sufficient flow of air by natural draft to cool the casing 20 and the condenser pipe coil 25. The induced draft of air flows upwardly between the fins and between the condenser and the casing, at the same time drawing air into the space between them through the turns of condenser pipe.

In accordance with my invention, as described and claimed in my application, Serial No. 554,623, filed August 3, 1931, which is a division of my present application, I provide openings in the housing 10, and arrange the casing 20 and the condenser 25 in such relation to these openings as to induce sufficient flow of air through the housing by natural draft to cool the casing and condenser. In the construction shown, I do this by making the lower end of the housing 10 open, and providing horizontal louvers 30 in the rear wall thereof, a lower group of which direct air into the housing 10, and the remainder of which direct air outwardly therefrom. The circulation of air through the housing is further facilitated by vertically arranged louvers 31 in the side walls of the housing. The casing 20 and condenser 25 are arranged so that air can flow freely into the lower end of the space between the casing and the condenser from the bottom of the housing, and from the lower group of louvers 30 in the rear wall of the housing 10. The air flowing between the condenser pipe coil 25 and the casing 20 which flows by natural draft, cools them and is then discharged from the housing through the upper group of louvers 30 and the louvers 31 in the side wall thereof.

In order to utilize the surfaces of the housing 10 for cooling the condenser of the refrigerating system, I extend a pipe coil 32, which is connected between the lower end of the condenser 25 and the float chamber 27 and forms part of the condenser of the refrigerating system, about the inner walls of the housing 10 and secure the same in good thermal contact with these walls throughout a considerable portion of its length by clamps 33 attached to the walls, or by any other suitable means. In this way heat is conducted from the pipe coil 32 to the walls of the housing, which cools the coil. This construction also forms part of the subject matter of my above-mentioned application, Serial No. 554,623.

It is desirable to prevent transmission of vibration or torque pulsations from the casing 20, containing the motor and compressor, to the housing 10, as such movement is very noticeable due to the ripples set up on the surface of the water in the glass bottle 11, and is also very objectionable, in many instances, as for example when the water cooler is placed in an office. I, therefore, resiliently support the casing 20 enclosing the motor 21 and compressor 22 in the lower portion of the housing 10 on two flexible members 34 which are preferably substantially parallel to the axis of rotation of the compressor. These flexible members, or cables, are secured at the ends thereof to a rigid frame 35 by threaded couplings 36 and 37 to which the members 34 are secured by a leaded joint, and the frame is secured in the housing 10 by bolts 38. The casing 20 with the cooling fins and condenser thereon may be attached to the flexible members 34 intermediate the ends thereof in any suitable manner, but in the present instance I provide a metal strip 39 having a plurality of ears 40 bent around the cables so as to compress the same and thereby form a secure connection therewith. The strips 39 are welded to the casing 20 so that the unitary structure including the casing 20, cooling fins and condenser pipe coil 25 is resiliently supported in the lower part of the housing 10.

The compressor 22 withdraws vaporized refrigerant from the evaporator chamber 14 through a pipe 41 which communicates at one end with the upper end of the evaporator chamber at 42, and with the intake connection of the compressor indicated at 43 in the closed casing 20, the pipe 41 being formed with a coil 44 secured at one end to the frame 35 at 45, so as to permit free movement of the casing 20 on its resilient support. The connection between the condenser pipe coil 25 and the extension 32 of the condenser includes a pipe coil 32' which also permits free movement of the casing 20 on its resilient support.

In accordance with another aspect of my invention, I provide a simple water cooling unit which can be readily and cheaply produced. This water cooling unit includes cup-shaped receptacles 46 and 47, fitting one within the other and spaced apart to form the evaporator chamber 14. The inner receptacle 46 constitutes a water tank and is secured to the bottom of the outer receptacle 47 and an outlet opening 48 is formed therein to receive the connection 49 through which water is withdrawn from the water cooler at the faucet 15. The upturned mouth of the inner receptacle 46 is expanded to form a seat 49 for a rubber, or other resilient ring, 50, on which an inverted bottle or other suitable water container is supported with the mouth thereof immersed in the water cooling unit so as to maintain the level therein about as indicated at 13. The mouth of the receptacle 46 also extends beyond the seat 49 to form the top wall of the housing 10 of the water cooler and is turned over at 51 about the outwardly flared upper edge 52 of the upper wall 10' of the housing, which is preferably of cylindrical form. I join the upper edge of the cooling unit and the upper wall 10' of the housing by placing a suitable cement material 53 between the overturned mouth of the cooling unit and the upper wall of the housing. I prefer to use cement material as the surfaces of the evaporator and the wall 10' of the housing are coated with a vitreous enamel which would be likely to be cracked if a metal packing were employed.

The rubber ring 50 is notched at 50' to vent the water cooling unit so that water will be fed into the same from the inverted bottle as required. The ring 50 is also provided with a skirt 54 extending over the outwardly flared edge of the inner receptacle 46 and about the turned over portion 51 thereof. This skirt protects the enameled top of the housing of the water cooler from being cracked by striking the bottle 11 against the same or resting it thereon when it is being placed in inverted position on the resilient ring 50.

In accordance with another aspect of my invention, I provide an arrangement causing the water to be cooled in the cooling unit to flow over the surface thereof in an attenuated stream by a circuitous, or roundabout, path so as to most effectively utilize the cooling surfaces of the unit, and I also make the arrangement such that the surfaces of the water cooling unit are readily accessible for cleaning. In the cooling unit construction illustrated, I do this by arranging a removable cup 55, constituting a water chamber, in the water tank of the cooling unit which is removably supported therein on feet 56 formed on the bottom of the cup, and which is made of Monel metal, or other suitable non-corrosive material. The side wall of the cup is formed with a helical corrugation 57 arranged closely adjacent the side wall of the inner receptacle 46 for directing water flowing between the cup and the wall of the receptacle in a helical path from the upper end of the corrugation to the space inside of the cooling unit and below the cup. Water flows into the cup 55 from the bottle 11 in which the water level is maintained at 13 and I prefer to admit water from the cup to the space between the cup and the wall of the cooling unit through an opening 58 in the side wall of the cup at the top of the corrugation 57, although if desired the cup may be made shallow enough so that water will flow over the upper edge thereof into the space between the cup and the cooling unit. The space between the bottom of the cup 55 and the receptacle 46 constitutes a water storage chamber. It is apparent that when the cup 55 is removed from the cooling unit all of the surface thereof is readily accessible for cleaning.

When the bottle 11 is placed in inverted position on the cooling unit, the lower end thereof is likely to strike the inside wall of the cooling unit and crack the vitreous enameled surface. I prevent the enamel being cracked in this way by forming a flared mouth 59 on the cup which constitutes a shield between the inside of cooling unit and the bottle 11 and surrounding the mouth thereof. By this construction, when the bottle 11 is placed on the cooling unit, the shield 59 protects the enameled inner surface of the cooling unit.

In the operation of the water cooler which I have described vaporized refrigerant is withdrawn from the evaporator chamber 14 by the compressor 22 through the suction pipe 41 and coil 44, it is then discharged into the casing 20 from whence it flows to the condenser 25 and the extension thereof 32. The condensed liquid refrigerant then flows to the float chamber 27 from which it is supplied to the evaporator chamber 14 through the pipe 28 and connection 29. The motor 21 which drives the compressor 22 is intermittently operated to maintain the desired temperature in the cooling unit by the control device 60 having a thermo-responsive device 61 extending into contact with the outer wall of the evaporator chamber 14.

When water is withdrawn from the cooling unit at the faucet 15 it flows from the inside of the cup 55 through the opening 58 and then flows in an attenuated stream about the helical corrugation 57 between the cup and the inner wall of the cooling unit to the space in the cooling unit below the cup from which it flows to the faucet 15 through the outlet 49. In this way the cooling unit is utilized most effectively to cool the water withdrawn therefrom as it must flow in a thin or attenuated stream by a circuitous path over the surfaces of the cooling unit. Upon the water level in the cup 55 being lowered below the mouth of the inverted bottle 11 air is admitted thereto and water flows into the cup until the reduction in pressure above the water level in the bottle is equal to the head of water between the level of the water in the bottle and the cup.

Although I have shown my improved system in connection with a bottle water cooler it is apparent that many of the features thereof can be used for other purposes. I do not, therefore, desire my invention to be limited to the particular arrangement shown and described and I intend in the appended claims to cover all modifications which do not depart from the spirit and scope of my invention.

What I claim as new and desire to secure by Letters Patent of the United States, is:—

1. A refrigerating system, including a water cooling unit comprising two receptacles arranged one within the other and spaced apart to form a closed evaporator chamber, the bottoms of said receptacles having flattened faces in contact with each other and having a cold water outlet secured therein, means for supplying water to said inner receptacle, and means for withdrawing cold water from said receptacle through said outlet.

2. A refrigerating system including a supporting stand, a water cooling unit having an open topped water receptacle, an evaporator associated with said receptacle for cooling water therein, the mouth of said receptacle being formed with a continuous wall having a seat for supporting an inverted water container, and having a portion extending beyond said seat and constituting a top for said stand for supporting said receptacle and said container on said stand.

3. A refrigerating system including a supporting stand, said stand having a side wall flared outwardly at its upper edge, a water cooling unit having an open topped receptacle, and an evaporator associated with said receptacle for cooling water therein, the mouth of said receptacle being formed with a continuous wall constituting a top for said stand and turned over the upper edge of the side wall of said stand.

4. A refrigerating system, including a supporting stand, said stand having a side wall flared outwardly at its upper edge, a water cooling unit having an open topped receptacle, an evaporator associated with said receptacle for cooling water therein, the mouth of said receptacle being formed with a continuous wall turned over the upper edge of the side wall of said stand, and packing material between the turned over portion of said receptacle and the flared edge of said side wall for joining them together.

5. A refrigerating system including a supporting stand having an enameled side wall flared outwardly at its upper edge, a top turned over the edge of said side wall, and a packing material between the turned over portion of said top and the flared edge of said side wall for joining them together.

6. A refrigerating system including a supporting stand having an enameled side wall flared outwardly at its upper edge, a top turned over the edge of said side wall, and a cement packing material between the turned over portion of said top and the flared edge of said side wall for joining them together.

7. A refrigerating system including a supporting stand, said stand having a side wall flared outwardly at its upper edge, a water cooling unit having an open topped receptacle, an evaporator associated with said receptacle for cooling water therein, the mouth of said receptacle being formed with a continuous wall constituting a top for said stand and turned over the upper edge of the side wall of said stand and heat insulating material between said cooling unit and the side wall of said stand.

8. A refrigerating system including a supporting stand, a water cooling unit having an open top and means for supporting an inverted container over said cooling unit including a resilient ring having a skirt extending over the top of said stand for protecting the surface thereof.

9. A refrigerating system including supporting stand, a water cooling unit having an open top, and means for supporting an inverted container over said cooling unit including a notched resilient ring having a skirt extending over the top of said stand for protecting the surface thereof.

10. A refrigerating system including a cooling unit comprising a water chamber, an evaporator surrounding said water chamber, means communicating with said water chamber for directing water in a spiral path over the surface of said water chamber and in heat exchange relation with said evaporator, and a storage water chamber within said cooling unit.

11. A refrigerating system including a cooling unit comprising an evaporator, a water chamber in said evaporator, means for directing water from said water chamber in a spiral path over the surface of said evaporator in heat exchange relation therewith.

12. A refrigerating system including a water cooling unit comprising cup-shaped receptacles arranged one within the other and having their side walls secured together, said cup-shaped receptacles being spaced apart to form a closed evaporator chamber, a water chamber within said receptacles, means in communication with said water chamber for directing water from said water chamber in a spiral path over the surface of said evaporator and in heat exchange relation therewith.

13. A refrigerating system including a water cooling unit comprising two receptacles arranged one within the other and spaced apart to form a closed evaporator chamber, a water chamber within said receptacles, and means for directing water from said water chamber in a spiral path over the surface of said evaporator and in heat exchange relation therewith.

14. A refrigerating system including a water cooling unit having a water tank, means for supplying water to and withdrawing water from said water tank, and means for causing the water withdrawn from said tank to flow in an attenuated stream by a circuitous path over the surface of said tank.

15. A refrigerating system including a water cooling unit having a water tank, means for supplying water to and withdrawing water from said water tank, and means including a deflecting wall between the means for supplying water to said tank and the means for withdrawing water therefrom for causing water withdrawn from said cooling unit to flow in an attenuated stream over the surface of said tank.

16. A refrigerating system including a water cooling unit having a water tank, means for supplying water to and withdrawing water from said water tank, and means including a corrugated deflecting wall between the means for supplying water to said tank and the means for withdrawing water therefrom for causing water withdrawn from said cooling unit to flow in an attenuated stream over the surface of said tank.

17. A refrigerating system including a water cooling unit having a water tank, means for supplying water to and withdrawing water from said water tank, and means including a deflecting wall between the means for supplying water to said tank and the means for withdrawing water therefrom having a helical corrugation therein for causing water withdrawn from said cooling unit to flow in an attenuated helical stream over the surface of said tank.

18. A refrigerating system including a water cooling unit, a removable cup in said cooling unit spaced from the wall thereof, means for supplying water to said cup, and means for withdrawing water from said cooling unit below said cup, said cup being formed and arranged to cause the water withdrawn from said cooling unit to flow therefrom in an attenuated stream between said cup and the wall of said cooling unit.

19. A refrigerating system including a water cooling unit, a removable cup in said cooling unit spaced from the wall thereof, means for supplying water to said cup, and means for withdrawing water from said cooling unit below said cup, said cup being corrugated and formed to cause the water withdrawn from said cooling unit to flow therefrom in an attenuated stream by a circuitous path between said cup and the wall of said cooling unit.

20. A refrigerating system including a water cooling unit, a removable cup in said cooling unit spaced from the wall thereof, means for supplying water to said cup, and means for withdrawing water from said cooling unit below said cup, said cup having a helical corrugation and being formed and arranged to cause the water withdrawn from said cooling unit to flow therefrom in an attenuated stream by a helical path between said cup and the wall of said cooling unit.

21. A refrigerating system including a water cooling unit having an inverted water container for supplying water thereto, means including a cup in said cooling unit spaced from the wall thereof for causing water withdrawn from said cooling unit to flow in an attenuated stream between said cup and the wall of said cooling unit, said cup extending around the lower end of said inverted container to form a shield for preventing the same coming into contact with the wall of said cooling unit when said container is placed thereon.

22. A refrigerating system including a water cooling unit constituting a water tank, an inverted water container for supplying water to said tank, and a shield in said water tank surrounding the lower portion of said container for preventing the same coming into contact with the wall of said cooling unit when said container is placed thereon.

CHRISTIAN STEENSTRUP.